UNITED STATES PATENT OFFICE.

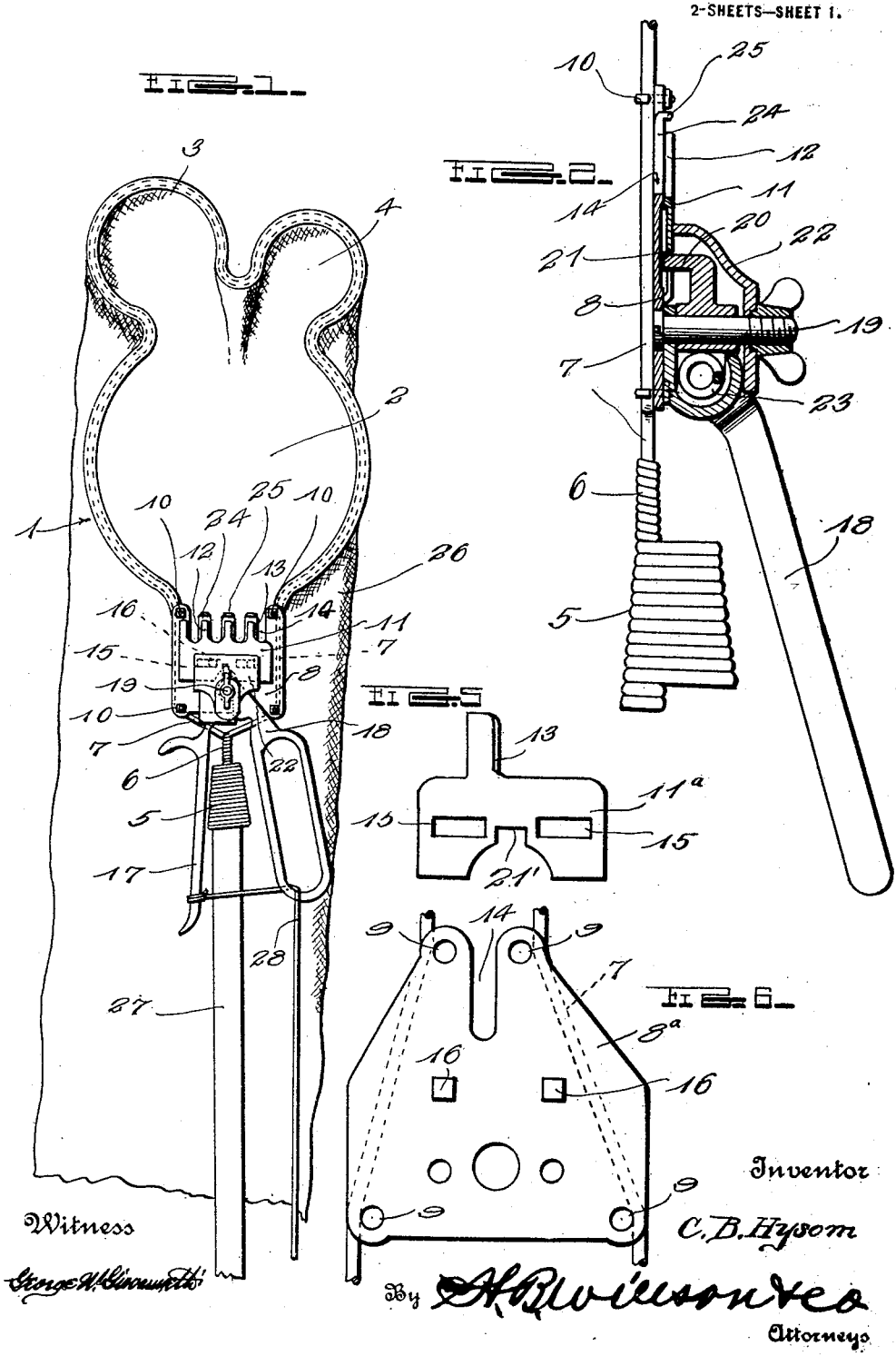

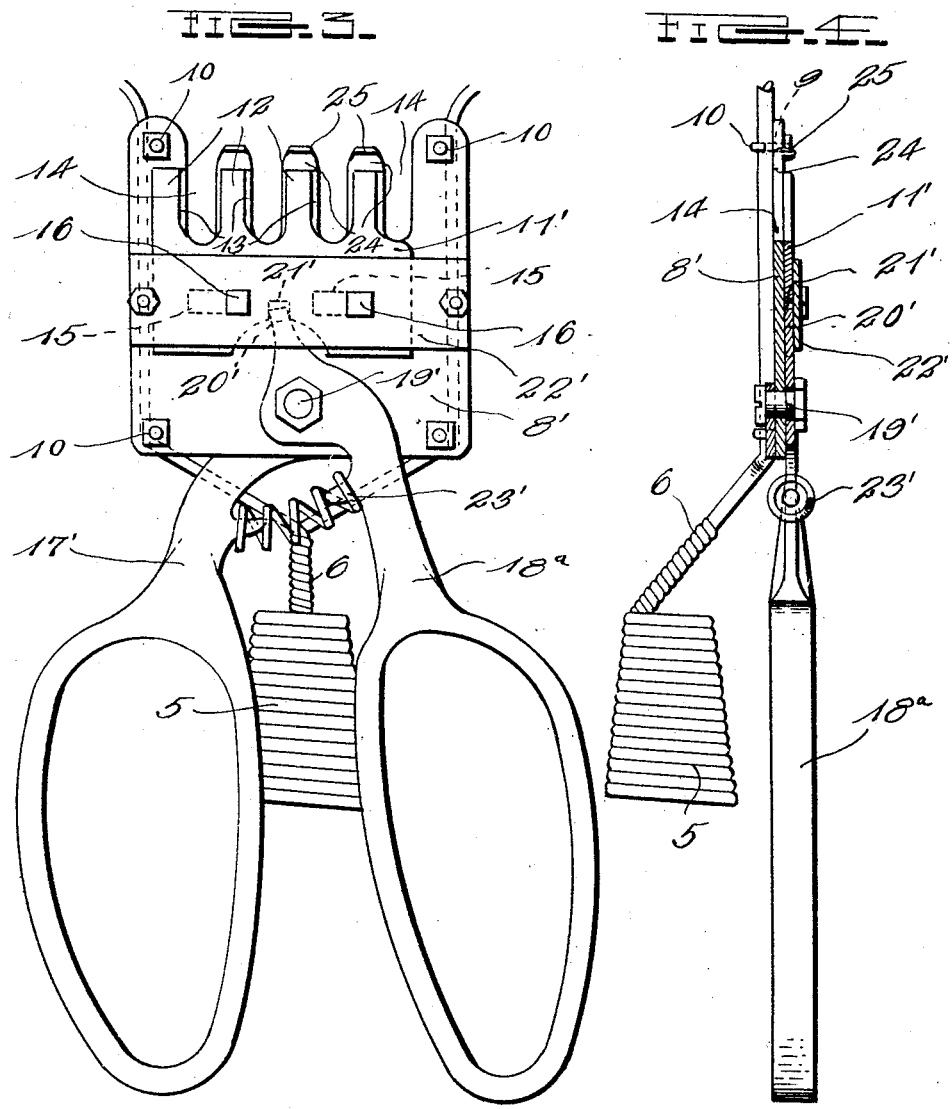

CORNELIUS B. HYSOM, OF SANTA CRUZ, CALIFORNIA.

FRUIT GAGER AND GATHERER.

1,376,338.   Specification of Letters Patent.   Patented Apr. 26, 1921.

Application filed August 9, 1920. Serial No. 402,116.

*To all whom it may concern:*

Be it known that I, CORNELIUS B. HYSOM, a citizen of the United States, residing at Santa Cruz, in the county of Santa Cruz and State of California, have invented certain new and useful Improvements in Fruit Gagers and Gatherers; and I do declare the following to be a full, clear, and exact description of the invention, such as will enable others skilled in the art to which it appertains to make and use the same.

This invention relates to fruit gagers and gatherers, and is especially useful in gathering apples, peaches, pears, oranges and other relatively large globular fruits which grow on parts of trees out of easy access or arm's reach of persons on or relatively near the ground.

One object of this invention is to generally improve upon devices of this character by providing an improved device with which the fruit-stems can be quickly and easily cut in the event the fruit is not easily pulled and would be bruised by pressure of the pulling loops.

Another object is to provide an improved one-piece wire structure or loop-member including a guide-tube-holder and fruit-pulling loops of different sizes, which loops also constitute gages for determining the size or grade of fruit to be gathered and the sizes to be left for future gathering and gaging, and the size to remain ungathered.

A further object is to provide an improved cutting device which can be operated directly by one hand when the fruit is at close range, and can be quickly and easily made operable through an actuating medium when the fruit is at a relatively distant range, said one-piece wire structure including a socket for receiving a reach-pole, also including an attaching portion to which the cutter is removably secured and can be quickly and easily detached for sharpening.

Other objects and advantages will be pointed out or implied in the following details of description, in connection with the accompanying drawings, in which:

Figure 1 is a view illustrating one form of my improved fruit gathering device, the lower portions of the reach-pole, conveying tube and actuating line or cord being broken off.

Fig. 2 is an enlarged longitudinal or vertical sectional view through the device illustrated in Fig. 1, Fig. 3 is a modified form of the fruit gathering device, Fig. 4 is a longitudinal sectional view through the device shown in Fig. 3, Fig. 5 is a detail view illustrating a form of cutting blade which may be employed in lieu of the cutting blades shown in the remaining figures, Fig. 6 is a detail view of a plate which coacts with the cutting blade shown in Fig. 5, this plate being a modification of the plates shown in the remaining figures, and Fig. 7 is a perspective view of a keeper or retaining plate for holding the cutting blade 11' against the plate 8'.

Referring to these drawings in detail, in which similar reference characters correspond with similar parts throughout the several views, the invention consists in the construction and arrangement of parts which will now be described as follows:

Referring more particularly to Fig. 1, the numeral 1 refers to a combined pulling and gaging device here shown in the form of a wire frame or loop-member which is preferably formed of a single length of wire and comprises a main opening or passage 2, substantially circular engaging loops 3 and 4, of different sizes, a helically formed socket 5, a stem or shank 6 which connects the socket with the remaining portion of the wire member, and an extension of the main opening or passage 2, indicated at 7, this extension comprising substantially parallel sides of wire as employed in connection with the structure shown in Figs. 1 to 4 inclusive, but being convergent toward the opening 2 when used in connection with the plate shown in Fig. 6, as indicated in dotted lines in Fig. 6. In this connection it should be understood that the plate 8ª shown in Fig. 6 is a modification of the plates 8 and 8' shown in Figs. 1 to 4 inclusive, the plate 8' being a slight modification of the plate 8.

Each of the plates 8, 8' and 8ª is provided with apertures 9 for receiving bolts or other securing means indicated at 10. The devices 10 are preferably in the form of hook-bolts, and by loosening the nuts of these bolts, the plate can be released from its engagement with the frame 1 without removing the bolts 10. Upon the plate 8 or 8' is mounted, a cutting blade or knife 11 which is provided with a plurality of cutting tongues 12, which are spaced sufficiently to receive fruit-stems therebetween. The cutting edge of each of these members 12 is indicated at 13. Each of the plates 8 and 8$^a$ is provided with a plurality of notches 14 which are sufficiently wide to receive the fruit-stems therein, and these notches normally register with the spaces between the cutting elements 12. Each of the cutting blades 11 is slotted at 15, and each plate 8 and 8' is provided with guiding studs 16 which extend through the slots 15 and guide the cutting blade in its cutting movements. Each of the plates 8 and 8' is provided with a handle or arm 17 and 17' which is rigidly united with the plate and extends downward or outward from the opposite side of the plate from the notches 14.

Hand-levers 18 and 18$^a$ are pivotally connected to the plates 8 and 8' by means of pivot-bolts 19 and 19', these levers being operatively engaged with the cutting blades 11 and 11' by means of an extension 20 and 20', these extensions being engaged with notches or recesses 21 and 21' respectively, as shown in Figs. 2 and 3. Keepers 22 and 22' are removably secured to the plates 8 and 8', respectively, and these keepers bear upon the blades 11 and 11' for holding them tight against the plates so that the edges of the notches 14 coact with the cutting edges 13 of the blades for cutting the fruit-stems which are in the notches 14. It should be understood, of course, that the blades 11 and 11' are reciprocated, for moving the edges 13 across the notches 14 by movement of the levers 18 and 18$^a$, toward and from the handles 17 and 17'. Springs 23 and 23' are employed for holding the levers 18 and 18$^a$ in the normal position, that is in the position for holding the cutting elements 12 between the notches 14. These notches are separated by arms or fingers 24, and each finger 24 is formed with an upturned end or flange 25 which guards the joints between the elements 12 and 24, at the same time presenting a blunt or non-puncturing surface, so that the outwardly tapering or converging end portions of the elements 24 will not puncture the surface of any fruit with which it might come into contact.

With the device thus far described, an operator can gather fruit by carrying the device with one hand, by means of the handle 17 and lever 18 or 17' and 18$^a$, projecting the device for causing its main passage 2 to receive an apple, for instance, then moving the device so that the apple will pass or tend to pass through the larger of the loops 3. If it is the operator's intention to gather only such fruits as will not pass through the loops 3, he will leave unpicked all apples which pass therethrough; and such apples as will not pass therethrough, are either pulled by means of the loop 3 or clipped by means of the cutting blade 11 or 11'. However, upon gaging an apple and finding that it will not pass through the loop 3 and is easily pulled by means of this loop, it will ordinarily be thus pulled; but, to avoid bruising the fruit which is not easily pulled, the stem of such fruit is passed through one of the notches 14 and cut by the coöperation of this notch with the cutting blade 11 or 11', the handle 18 or 18' being manipulated for this purpose, by closing the hand of the operator for bringing the handle 17 and lever 18 or 17' and 18$^a$ toward one another, any suitable means being employed for catching or receiving the fruit thus severed from the tree. However, to prevent any possibility of the fruit falling to the ground and being bruised thereby, I may either employ a flexible chute or tube, such as or similar to the one disclosed in my prior Patent No. 853,458, patented May 14, 1907, or I may employ any suitable guiding or conveying tube or bag 26 which has its inlet end engaged with and held open by means of the wire loop member or frame 1. Moreover, in order that the device may be used for gathering fruit which is out of arm's reach, that is, out of such close proximity to a person that it cannot be reached with the device when held by the operating levers, a reach-pole 27 may be inserted in the socket 5, and the fruit may either be pulled by means of the gaging loop 3 or 4, or its stem may be cut or clipped by means of the cutting blade 11 or 11' in coöperation with the edges of the notches 14. Any appropriate means may be employed for operating the lever 18 when the device is out of arm's reach, that is, extended by means of the reach-pole 27. A simple and effective device for this purpose is shown in Fig. 1, and consists of a rod or cord 28 which extends through the loops of the lever 18 and is secured to the arm or handle 17. By pulling the cord 28 downwardly, it is caused to slide through the loop of the lever 18 and draw this lever toward the handle 17, thereby moving the knife or knife blade 11 in the direction for cutting the stem or stems which are in the notches 14.

Where a comparatively cheap or inexpensive device of this character is desirable, the device may be equipped with a cutting blade having a single cutting edge 13 as indicated at 11$^a$ in Fig. 5, this blade being provided with apertures 15 and a notch 21' such as employed in the device illustrated in Fig. 3. The cutting blade 11$^a$ is employed in connection with the plate illustrated in Fig. 6, that is, a plate having only one notch 14, but being provided with apertures 9 and guiding lugs 16 such as employed in the other devices. However, the devices having a plurality of cutting edges 13, while being somewhat more expensive, are more desirable for obvious reasons.

Referring again to the wire member 1, and especially to the socket portion which is formed by simultaneously winding both ends of the wire into a series of helical turns, it will be seen that this not only provides the socket 5 with internal screw-threads, formed by the helices of the wire, but also provides flexible sockets or connections which yield to prevent injury to the remaining portion of the wire member in the event it is thrust against a limb or other obstruction. Moreover, this provides a handle, that is the socket itself is a handle whereby the gaging and gathering portions of the wire member may be handled for gathering and gaging fruit from small trees, or from ladders, platforms, etc., where the fruit being gaged and gathered is practically at arm's length. Under such conditions, the stem-cutting device may be detached, as well as the pole 27, so that the wire member may be handled with greater ease and facility in view of the decreased weight and bulk.

It is not intended to limit this invention to the exact details of construction and arrangement as shown and specified, but changes may be made within the scope of the inventive ideas as implied and claimed.

I claim:

1. In a fruit gaging and gathering device, a wire loop member including a main passage and gaging loops of different sizes, and a cutting device associated with said wire loop member for carrying the same and cutting fruit stems.

2. In a fruit gatherer, a wire loop member including a main passage and gaging loops of different sizes in open communication with the main passage, said main passage being larger than the largest one of the gaging loops, said wire loop member being provided with a handle at a point spaced from the gaging loops and being operable by said handle to gage and pull fruits by means of said gaging loops as specified.

3. In a fruit gaging and gathering device, a wire loop member including a main passage and gaging loops of different sizes, said member also including a socket for securing a reach-pole thereto, said socket being formed by a helical extension of the piece of wire forming said main passage and gaging loops, and cutting means associated with said wire loop member.

4. In a fruit gatherer, a stem-cutting device including correlated cutting blades, a lever operable to actuate said blades relative to one another for causing them to cut fruit-stems, said lever being shaped and arranged to be gripped and actuated by a single hand of an operator, a reach-pole, means to detachably secure said reach-pole to said cutting device for projecting the latter to points beyond arm's reach, and means to actuate said lever while said reach-pole holds it out of arm's reach.

5. In a fruit gathering device, a wire loop member formed with a main passage and gaging loops of different sizes in open communication with said main passage, the latter being larger than the largest one of said gaging loops, a plate having a notch to receive fruit-stems to be cut, said wire loop member having a portion bridged by and secured to said plate in such relation that said notch opens into said main passage, a handle united with said plate, a cutting blade on said plate and operable to cut a fruit stem when it is in said notch, and a lever pivoted on said plate and correlated with said handle to effect the cutting movement of said blade.

6. The structure defined by claim 4, a plate bridging and secured to a portion of the wire loop member between said socket and main passage, said plate having a stem-receiving notch opening into said main loop, a handle on said plate, a cutting blade on said plate operable to cut a fruit-stem when it is in said notch, and a hand-lever pivoted on said plate and correlated with said handle to actuate said cutting blade.

7. A device of the type set forth comprising a combined fruit gaging and pulling device formed from a single length of wire bent to form a relatively large substantially circular loop and a plurality of substantially circular smaller loops of different sizes opening into the first named loop.

8. The structure set forth in claim 2, together with a cutter connected with said loop member opposite said gaging loop for severing the stems of fruit which cannot be easily separated from the limbs by said gaging loops.

9. A device of the class described comprising a handle, and a combined fruit gage and puller carried thereby, being composed of a single length of wire bent to form a plurality of loops of different sizes, the free ends of said wire being twisted around one another and the extremities being coiled to provide a socket for the handle.

In testimony whereof I have hereunto set my hand.

CORNELIUS B. HYSOM.